United States Patent [19]

Sobresky, Sr.

[11] 4,309,111

[45] Jan. 5, 1982

[54] VISUAL COIN GRADER

[76] Inventor: Edmund J. Sobresky, Sr., Willow & Airy Sts., Pottstown, Pa. 19464

[21] Appl. No.: 131,815

[22] Filed: Mar. 19, 1980

[51] Int. Cl.$^3$ .................. G09B 25/00; G02B 27/00
[52] U.S. Cl. .................. 356/394; 350/239; 356/243; 434/367
[58] Field of Search .......... 356/393, 243–244, 356/256, 394; 350/238–241; 206/0.84; 40/27.5, 375, 491; 133/1 R; 434/367, 369, 426

[56] References Cited

U.S. PATENT DOCUMENTS

| | | | |
|---|---|---|---|
| 2,121,246 | 6/1938 | Gordon | 434/367 |
| 2,425,197 | 8/1947 | Montague | 434/426 |
| 2,533,628 | 12/1950 | Rosenberg | 350/241 |
| 3,200,517 | 8/1965 | D'Agostino | 40/491 |
| 3,609,045 | 9/1971 | Stein | 356/243 |
| 4,191,472 | 3/1980 | Mason | 356/394 |

*Primary Examiner*—William H. Punter
*Attorney, Agent, or Firm*—Jack C. Munro

[57] ABSTRACT

An apparatus to facilitate the grading of coins which takes the form of a thin planar housing which has an elongated rectangularly shaped recess within its upper planar surface. Adjacent the elongated recess is located a plurality of standard graded master coin replicas, made in accordance with certain accepted standards, which are sequentially arranged from the greatest wear condition to the least wear condition, such as "very good", "fine", "very fine", and "extra fine". A block is located within the recess and is movable longitudinally along the entire length of the recess. Upon the block is to be located the coin which is to be graded. This coin is capable of being positioned directly adjacent each specimen. The observer can then accurately determine the precise wear level of this coin. The block is maintained in continuous contact with the recess through the use of a ridge and groove assembly.

2 Claims, 2 Drawing Figures

VISUAL COIN GRADER

BACKGROUND OF THE INVENTION

The field of this invention relates to a device to facilitate the accurate ascertaining of the amount of wear a particular structure has been subjected to. More particularly, the present invention is directed to a device which facilitates the determining of the amount of wear incurred by coins and the categorizing of these coins in order of the amount of wear.

In the field of numismatics, it is most common to assign levels of wear that a coin has encountered. These commonly assigned values for levels of wear are "very good", "fine", "very fine", and "extra fine". "Very good" means that the coin has received the greatest amount of wear, whereas "extra fine" denotes that the coin has received only a very little amount of wear and is approaching the condition of uncirculated.

The normal procedure for the grading of a coin by a numismatist if for the coin to be observed and, based on experience, the condition of wear is assigned to that coin. Normally, the numismatist is fairly accurate in this designation. However, other individuals, such as coins collectors and people that are fairly recent in the collecting of coins may not accurately grade a coin.

There is a need for a device which is relatively inexpensive, is simple to use, which facilitates the accurate grading of coins by individuals who may not have the experience to accurately establish the wear condition of a coin solely by observation.

SUMMARY OF THE INVENTION

The structure of this invention is summarily described in the Abstract of the Disclosure and reference is to be had thereto.

The primary objective of this invention is to construct a device which facilitates the accurate determination of the wear quality of a coin by even the most inexperienced individual.

A further objective of this invention makes possible the instant grading of coins by matching them with prepared and properly graded coin replicas in specific grades.

It is intended that variations of the device of this invention are to be made for all different types of coins of all denominations, from the entire U.S. mintage from 1793 to the present, and also for all colonial issues prior to 1793. Also, any combination of the following grade classifications can be used: About Good, Good, Very Good, Fine, Very Fine, Choice Very Fine, Extremely Fine, Choice Extremely Fine, About Uncirculated, Choice About Uncirculated, Uncirculated, Choice Uncirculated, Perfect Uncirculated, and Proof. It would be the manufacturer's option as to which and how many grade classifications would be used in the coin graders for the different types of coins.

DETAILED DESCRIPTION OF THE SHOWN EMBODIMENT

Figure 1:
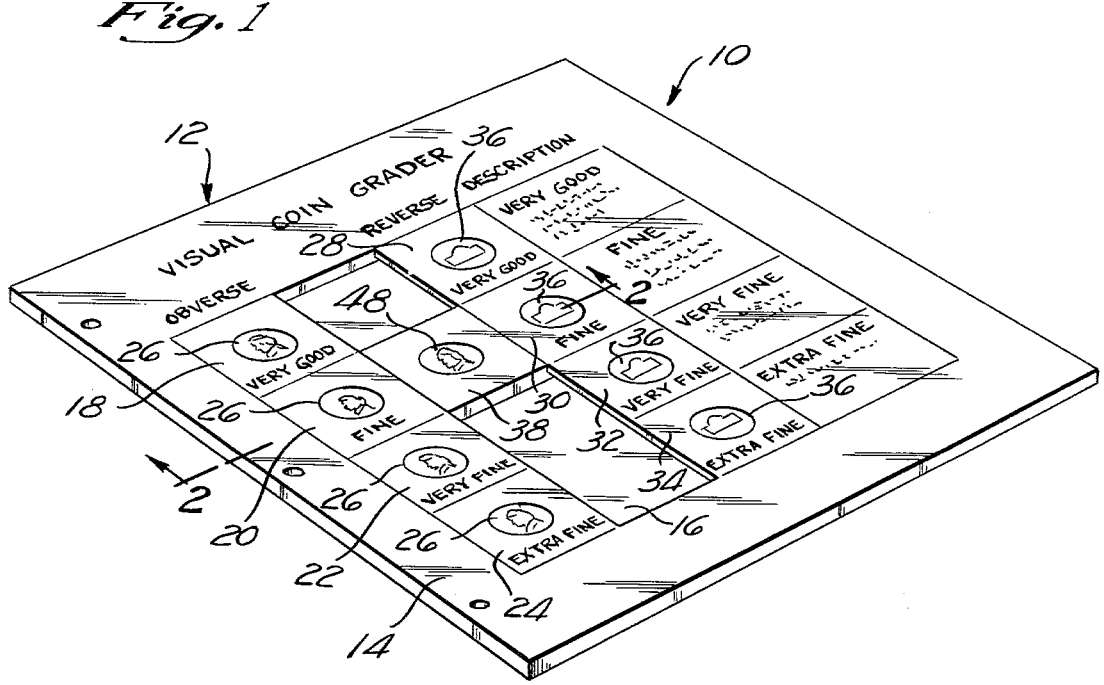
FIG. 1 is an isometric view of the coin grading apparatus of this invention.
Figure 2:
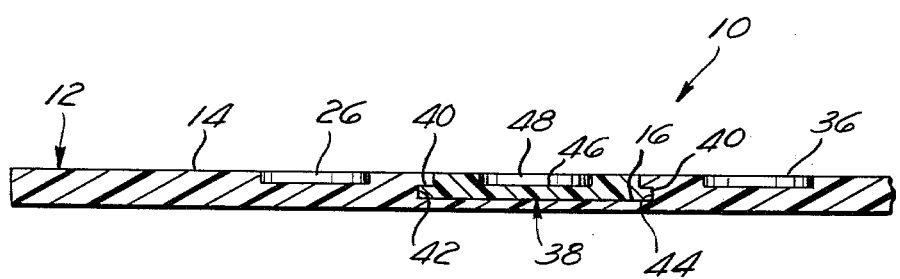
FIG. 2 is a cross-sectional view through the coin grading apparatus of this invention taken along line 2—2 of FIG. 1.

Referring particularly to the drawing, there is shown a coin grader 10 of this invention which is constructed of a thin, sheet-like housing 12 which has a planar upper surface 14. Formed within the housing 12 and connecting with the upper surface 14 is an elongated recess 16.

On the left side of the recess 16 and within the planar surface 14, there is defined a plurality of square shaped areas 18, 20, 22, and 24. The areas 18–24 are each to include a specimen which may comprise an actual coin or could comprise a representation of an actual coin.

Each of the areas 18–24 are to denote the obverse side of the coin. The area 18 is to denote a "very good" condition coin, with area 20 to represent the "fine" condition coin, the area 22 to represent the "very fine", and area 24 the "extra fine" condition coin. The specimen representations 26 within the areas 18, 20, 22 and 24 are to represent the specific condition of wear for the particular area. It is to be noted that the representations of wear are located in a sequential manner from the condition of most wear (very good) to the condition of least wear (extra fine).

Similarly, on the right side of the recess 16 there are located areas 28, 30, 32 and 34, which are each to contain a specimen 36. The specimen 36 shows the reverse side of the coin. The area 28 is to denote the condition of wear termed "very good" with the area 30 being "fine", the area 32 being "very fine" and area 34 being "extra fine".

Alongside of the areas 28–34, there is located a written description. This written description is to what constitutes "very good", "fine", "very fine", and "extra fine". This is merely for the purpose of helping assist the operator in the grading of a coin.

Within the recess 16 there is slidably mounted a block 38. At each lateral side of the block 38 there is located a longitudinal ridge 40. Each ridge 40 is to connect with a longitudinal groove 42 which is located directly adjacent the areas 18, 20, 22, and 24 while the opposite ridge 40 connects with a longitudinal groove 44 directly adjacent the areas 28, 30, 32 and 34. It should be readily apparent that the block 38 is maintained engaged within the recess 16, but is slidable entirely throughout the longitudinal length of the recess 16. The physical size of the block 38 is identical to the size of each of the areas 18, 20, 22, 28, 30, 32 and 34.

Within the upper surface of the block 38, there is to be located the coin 48 to be graded. The operator is to merely take a coin 48 and drop the obverse side of such within the opening 46. The operator then slides the block 38 to the position adjacent areas 18 and 28, and then adjacent areas 20 and 30, and then adjacent areas 22 and 32, and then adjacent areas 24 and 34. The operator can then readily compare the wear condition of the coin 48 with respect to the specimens 26 and 36 to determine the precise condition of the coin 48. It is to be understood that the coin 48 can be removed and turned over so that the reverse side of the coin can be compared, as well as the obverse side.

Once the condition of the coin has been accurately determined, the coin 48 is to be removed from the opening 46 and placed within an appropriate storage location (not shown).

What is claimed is:

1. A coin grading apparatus comprising:

a housing, said housing having an elongated recess;

a plurality of coin grading specimens mounted within said housing directly adjacent said elongated recess, each said coin grading specimen to accurately represent a specific wear state for a coin, there being a plurality of said specimens for each side of said coin to permit ascertaining the state of wear of both the obverse and reverse side of said coin, said specimens being divided into a pair of spaced-apart rows, one of said rows representing the obverse side of the coin and the other of said rows representing the reverse side of the coin, said specimens within each said row being arranged in a sequential manner along said recess from the most worn state to the least worn state;

a block slidably mounted by slidable means within said elongated recess and movable the entire longitudinal length of said recess, said block located between said rows, a coin to be graded according to the extent of wear is to be mounted within an opening on said block, whereby said coin is to be moved along side each of said specimens and by visually comparing said coin with said specimens the wear quality of said coin can be ascertained; and indicia located beside each said specimen and on said housing, said indicia to define the wear state of each said specimen.

2. The coin grading apparatus as defined in claim 1 wherein:

said slidable means comprising a mating ridge and groove assembly.

* * * * *